United States Patent [19]
Batchelor

[11] 3,935,537
[45] Jan. 27, 1976

[54] APPARATUS FOR MEASURING ANGULAR MOVEMENT

[75] Inventor: Richard William Batchelor, Solihull, England

[73] Assignee: The Lucas Electrical Company Limited, Birmingham, England

[22] Filed: Apr. 2, 1974

[21] Appl. No.: 457,185

[30] Foreign Application Priority Data
Apr. 3, 1973 United Kingdom............... 15866/73

[52] U.S. Cl..................................... 328/5; 324/166
[51] Int. Cl.$^2$.......................................... G01P 3/48
[58] Field of Search ........ 328/5, 161; 324/101, 163, 324/166, 166 D, 167, 173, 174

[56] References Cited
UNITED STATES PATENTS

| | | | |
|---|---|---|---|
| 3,636,545 | 1/1972 | Boyd et al.................... | 324/166 UX |
| 3,639,753 | 2/1972 | Reich........................... | 324/173 UX |
| 3,748,580 | 7/1973 | Stevens et al.................. | 324/174 X |
| 3,757,167 | 9/1973 | Yoshikawa et al............. | 324/166 UX |
| 3,818,342 | 6/1974 | Stevens........................ | 324/166 X |

OTHER PUBLICATIONS

Sinha, "New High–Precision Digital Tachometer," *Electronics Letters*, Vol. 7, No. 8, Apr. 22, 1971, pp. 174–176.

Primary Examiner—James B. Mullins
Attorney, Agent, or Firm—Holman & Stern

[57] ABSTRACT

Apparatus for measuring the angular movement of a body comprises a tranducer for providing a signal the frequency $f_i$ of which is dependent on the angular velocity of the body and a reference frequency source providing a reference frequency $f_r$. An $(n + m)$ stage binary counter is provided for counting the number of reference pulses in time period $1/f_i$ and an $(n + m)$ stage binary store receives a count from said counter when the latter receives a signal from the transducer. The apparatus also includes an $n$-stage binary rate multiplier having a first input for receiving the $n$ least significant figures of the store, and a second input for receiving an output signal from the apparatus, the rate multiplier being arranged to generate, during the period in which the rate multiplier receives $2^n$ binary pulses at said second input, a number of output pulses which is equal to the number of pulses applied to said first input. Dividing means receives first input signals equal to the $m$ most significant figures of the store in the absence of an output signal from said rate multiplier, and receives second input signals from said reference source, the dividing means producing an output signal which forms said output signal of the apparatus and which is determined by dividing the frequency reference signal by the signal applied to said first input of the dividing means. Moreover, means is provided for modifying the output signal from the dividing means when an output signal is obtained from the rate mutliplier, whereby $2^n$ output pulses are received between successive input pulses from the transducer, the maximum value of $f_r/f_i$ being $<2^{n+m}$, and the minimum value of $f_r/f_i$ being $2^n$.

5 Claims, 4 Drawing Figures 3,935,537

APPARATUS FOR MEASURING ANGULAR MOVEMENT

BACKGROUND OF THE INVENTION

This invention relates to apparatus for measuring angular movement of a body and has as its object the provision of such apparatus in a convenient form.

SUMMARY OF THE INVENTION

The invention resides in apparatus for measuring the angular movement of a body, comprising a transducer for providing a signal the frequency $f_i$ of which is dependent on the angular velocity of the body, a reference frequency source providing a reference frequency $f_r$, an $(n + m)$ stage binary counter for counting the number of reference pulses in time period $1/f_i$, an $(n + m)$ stage binary store for receiving a count from said counter when the latter receives a signal from the transducer, an n-stage binary rate multiplier having a first input for receiving the n least significant figures of the store, and a second input for receiving an output signal from the apparatus, said rate multiplier being arranged to generate, during the period in which the rate multiplier receives $2^n$ binary pulses at said second input, a number of output pulses which is equal to the number of pulses applied to said first input, dividing means receiving first input signals equal to the m most significant figures of the store in the absence of an output signal from said rate multiplier, and receiving second input signals from said reference source, said dividing means producing an output signal which forms said output signal of the apparatus and which is determined by dividing the frequency reference signal by the signal applied to said first input of the dividing means, and means modifying the output signal from said dividing means when an output signal is obtained from said rate multiplier, whereby $2^n$ output pulses are received between successive input pulses from the transducer, the maximum value of $f_r/f_i$ being $< 2^{n+m}$, and the minimum value of $f_r/f_i$ being $\geq 2^n$.

Conveniently said modifying means comprises a logic unit connected to receive a first input signal from the m most significant bits of said store, a second input signal from the output of said rate multiplier and a third input signal provided by said output signal from the dividing means, whereby, in the absence of an output signal from said rate multiplier the output signal from the store appears at the output of the logic unit, while in the presence of an output signal from the rate multiplier the logic unit increases the output signals from the store by one.

Alternatively, said modifying means may comprise a logic unit connected to receive a first input signal from said reference frequency source and a second input signal from the output of said rate multiplier, whereby in the presence of an output signal from the rate multiplier the dividing means is rendered inoperative.

Conveniently, adjustable means are provided for reducing the number of pulses applied by said reference frequency source to said counter during the time period $(1/f_i)$.

DESCRIPTION OF THE FIGURES

Conveniently, adjustable means are provided for reducing the number of pulses applied by said reference frequency source to said dividing means during the time period $(1/f_i)$.

The invention will now be more particularly described with reference to the accompanying drawings wherein.

DISCUSSION OF THE PREFERRED EMBODIMENT

Figure 1:
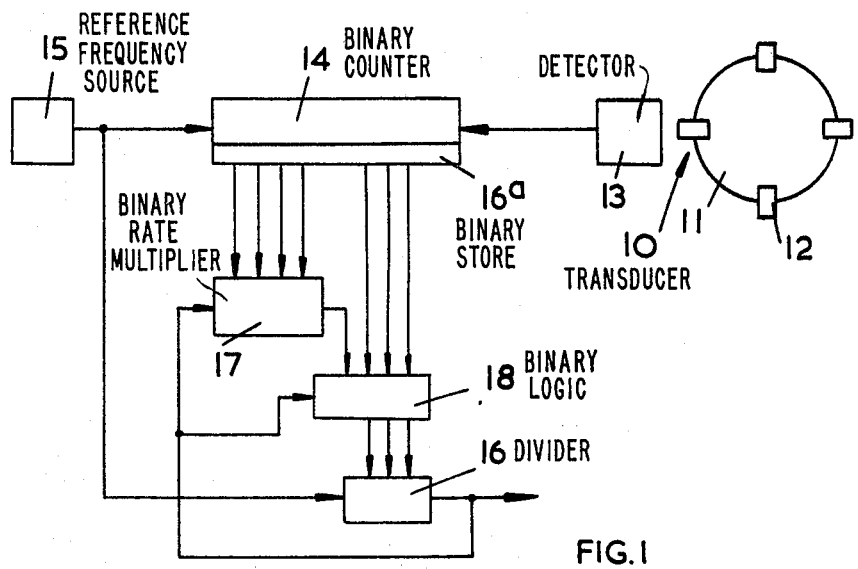
FIG. 1 is a block circuit diagram illustrating one embodiment of apparatus constructed in accordance with the present invention.

Referring now more particularly to FIG. 1 of the accompanying drawings, the apparatus shown therein is intended for measuring the rotational speed of a body and comprises a transducer 10 which in the example described comprises a disc 11 which forms part of or which is rotatable with the rotatable body and which has mounted thereon four equi-angularly spaced magnets. The transducer 10 also comprises a detector 13 in the form of a pick-up winding and this winding is connected to one input of an $(n + m)$ bit binary counter 14 which in the example described is a 7 bit binary counter.

The apparatus also comprises a reference frequency source 15, an output of which is connected to a second input of the counter 14 and also to one input of a dividing network 16. The output of network 16 provides an output connection for the apparatus as a whole. The counter 14 is arranged to count the number of reference frequency pulses produced between successive input pulses received from the detector 13, and the counter 14 is connected to a store 16a and so arranged that each time a pulse is received from the detector 13 the count in the counter 14 will be transferred to the store 16a and the counter 14 will be reset.

A 4-stage binary rate multiplier 17 receives at a first set of four inputs the four least significant figures of the store 16a and has at a second input the output signals from the dividing network 16. A binary logic unit 18 receives as a first input signal the three most significant figures of the store 16a, a second input signal being a binary signal from the output of the binary rate multiplier 17, and a third input signal from the output of the apparatus. The logic unit 18, on receipt of a pulse from the output of the divider network 16 and with no input signal from the binary rate multiplier 17, supplies signals to the dividing network 16 equal to the output signals from the three most significant bit of the store 16a, but on receipt of a pulse from the binary rate multiplier 17 the output signal from the logic unit 18 is moved to one greater than the output signals from the three most significant bits of the store 16a.

In operation and taking by way of example the frequency $f_r$ of the frequency reference source 15 as being equal to 1MHz, i.e. $1/f_r = 1$ micro-second, and suppose by way of example $T_i = 1/f_i = 32$ micro-seconds, where $f_i$ is the frequency of the input signals received by the counter 14 from the detector 13, then at the end of an input time $T_i$, the number transferred to the store will be 32 which in binary form is 0100000. The four least significant bits of this binary number are applied to the set of first inputs of the binary rate multiplier 17 and the three most significant bits are applied to the dividing network 16 through the binary logic unit 18. In the example described the input signal to the binary rate multiplier 17 will be equal to 0 so there will be no output signal from the binary rate multiplier 17. However, the input signals to the dividing network 16 will be 010 in binary form, that is to say decimal 2 and therefore the dividing network 16 will produce an output for every two pulses produced by the reference frequency source 15. Thus, the input pulse rate $f_i$ is effectively multiplied by 16.

Now considering by way of example the same reference source frequency $f_r$, this being equal to 1MHz, but considering a time period $T_i$ between successive input pulses from the detector 13 as being equal to 36 microseconds, then the number transferred to the store 16a after one input time period $T_i$ will be 36, that is to say 0100100 in binary form. The input to the dividing network 16 through the binary logic unit 18 will be 010, that is to say decimal 2 when the input to this dividing network is not modified by the binary rate multiplier 17. The input to the binary rate multiplier will be 0100, that is to say decimal 4. Thus for 16 ($2^4$) input pulses to the binary multiplier 17 from dividing network 16, i.e. in the period in which the binary rate multiplier 17 is cycled, there are four output pulses from the multiplier 17. If the binary rate multiplier 17 had no effect on the dividing network 16 the number of output pulses produced by the dividing network 16 over the period of 36 micro-seconds would be 18 instead of the required 16. However, when an output pulse is obtained from the binary rate multiplier 17, the input to the dividing network 16 is modified by one, that is to say instead of dividing by 2 the dividing network 16 will divide by 3. The time taken to divide by 3 instead of by 2 is 3 microseconds instead of 2 micro-seconds. Thus the output pulse from dividing network 16 is delayed by 1 microsecond every time the input to the dividing network 16 is modified by the binary rate multiplier rate 17. In the example, for 16 output pulses from the dividing network 16 there are 16 input pulses to the binary rate multiplier 17 and therefore 4 output pulses from the latter. The total delay for 16 output pulses will therefore be 4 micro-seconds and thus during the time period 36 micro-seconds there will be 16 output pulses from the dividing network 16 thus ensuring that the apparatus effectively multiplies the input frequency from the detector 13 by 16, i.e. ($2^4$).

It will therefore be seen that the above described apparatus improves the resolution of the detector 13 and the response time of subsequent processing circuits. Moreover it permits the detector 13 to be used for determining relatively accurately angular displacement of the body 11 in addition to or as an alternative to the determination of rotational speed of the body 11.

Summarising, where it is desired to obtain $2^n$ output pulses between successive input pulses from the detector 13, a $(n + m)$ bit binary counter 14 is provided together with a $(n + m)$ bit store 16a, where the frequency of the reference frequency source $f_r$ is such that the maximum value of $$\frac{f_r}{f_i} < 2^{n+m}$$

and a minimum value of $$\frac{f_r}{f_i} \geq 2^n.$$

In this case the $n$ least significant figures of the store are fed to the binary rate multiplier 17 and the $m$ most significant figures of the store are fed to the binary logic unit 18.

Figure 2:
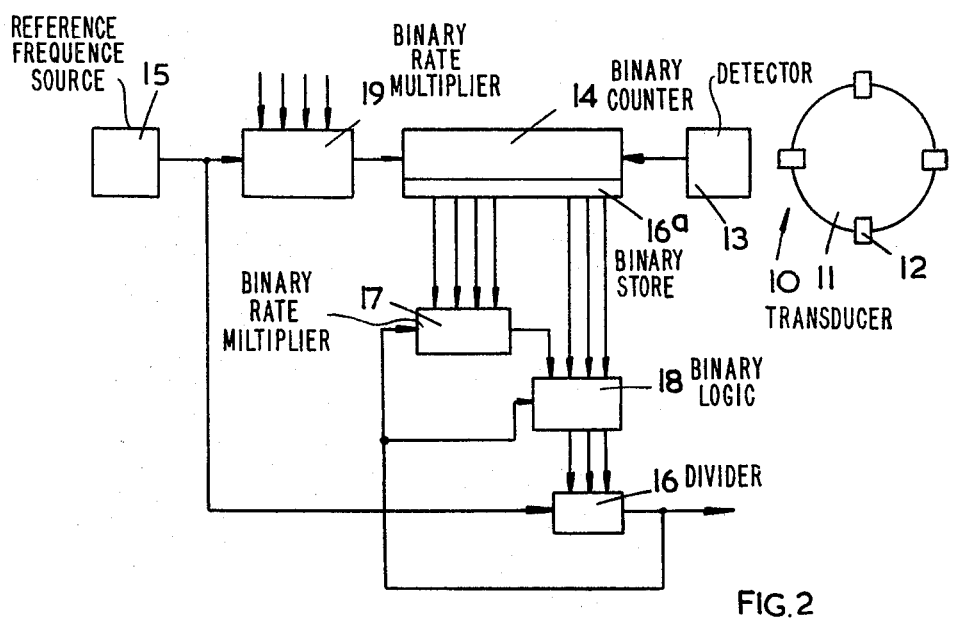
FIG. 2 shows a modification of the circuit illustrated in FIG. 1.

Referring now to FIG. 2, this shows a modification of FIG. 1 in that a further binary rate multiplier 19 is connected between the reference frequency source 15 and the counter 14, the first input to the dividing network 16 being connected to the junction of the reference frequency source 15 and the further binary rate multiplier 19. Now supposing the binary rate multiplier 19 is a 4 bit multiplier and has a binary number 1100, that is to say decimal 12, applied to one set of its inputs, then if $f_r$ = 1MHz and $T_i$ = 36 micro-seconds, between two successive input pulses from the detector 13 the binary rate multiplier 19 will receive 36 input pulses and it will transfer 36 × 12/16 = 27 pulses from the counter 14 to the store 16a. The effect of this on the remainder of the circuit is as if the binary rate multiplier 19 were not present and the input time period was 27 micro-seconds. Thus there will be 16 output pulses in a time period of 27 micro-seconds and therefore in a time period of 36 micro-seconds there will be an increased number of output pulses thereby increasing the number of output pulses produced during the time period $T_i$. The number of pulses produced during time period $T_i$ can be adjusted by adjusting the binary input of the binary rate multiplier 19.

Figure 3:
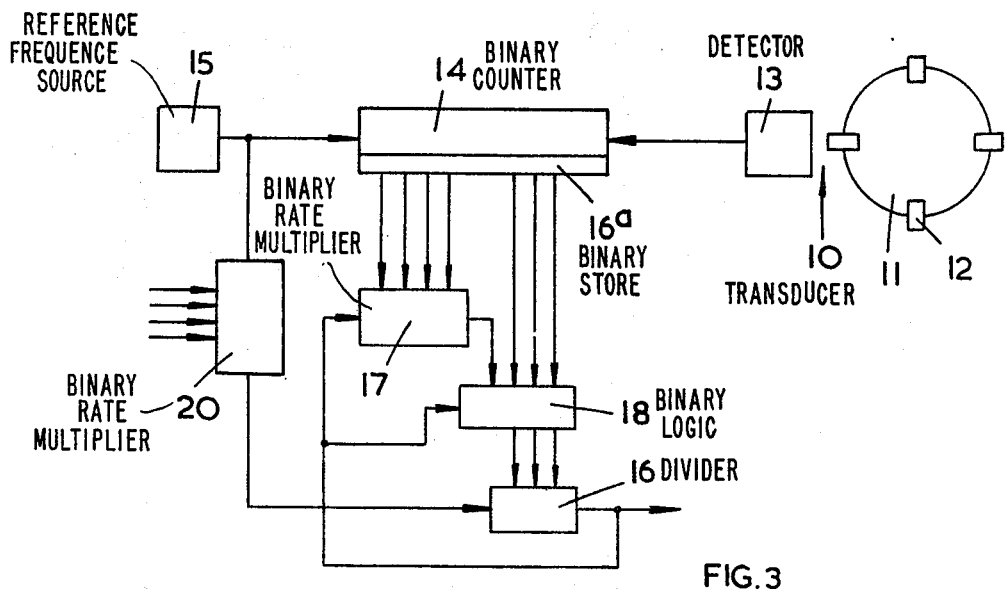
FIG. 3 shows a further modification of the circuit shown in FIG. 1.

Referring to FIG. 3 of the accompanying drawings, this shows a further modification of FIG. 1 where an additional binary rate multiplier 20 is connected between the reference frequency source 15 and the dividing network 16, the counter 14 being connected to the junction between the reference frequency source 15 and the binary rate multiplier 20. Now taking by way of example a reference frequency $f_r$ = 1MHz and a time period $T_i$ = 36 micro-seconds, then by applying binary 1100 to the set of inputs of the binary rate multiplier 20, the number of transferred to the store at the end of time period $T_i$ would be equal to 36 but during this time period $T_i$ the binary rate multiplier 20 only produces 36 × (12/16) pulses. Thus the number of output pulses produced by the dividing network in the time period $T_i$ will be reduced accordingly.

Figure 4:
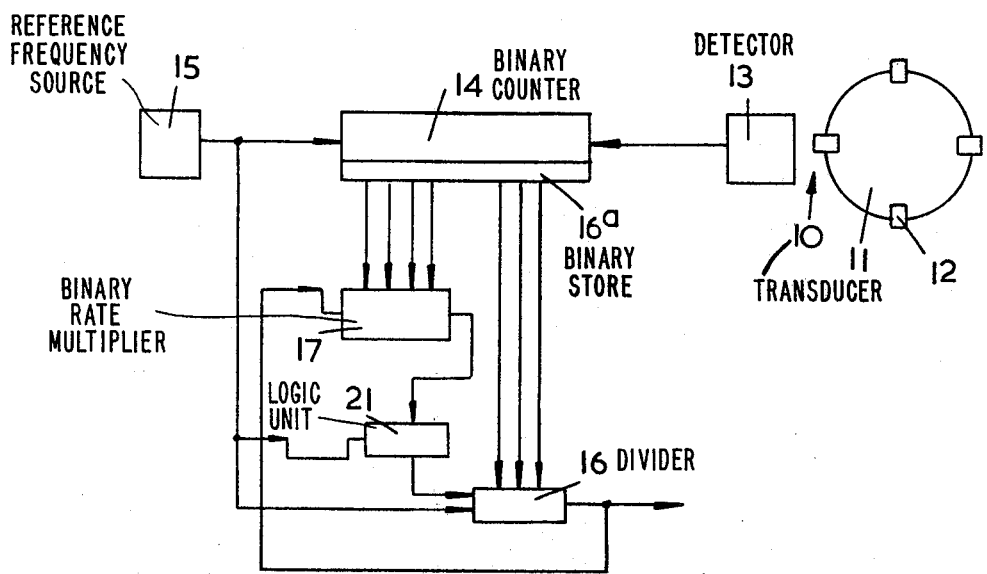
FIG. 4 is a block circuit diagram illustrating a further embodiment of apparatus constructed in accordance with the invention.

Referring finally to FIG. 4 an alternative arrangement is shown for the logic unit 18 of the previous examples. The numerals of the previous examples have been retained where the functions are the same. The logic unit 18 has been replaced by an alternative logic unit 21 having a first input from the reference frequency source 15 and a second input from the output of the rate multiplier 17, the output from the logic unit 21 is taken to a third input to the dividing means 16 which is fed at its first terminal directly from the $m$ most significant bits of the store 16a. On receipt of a pulse from the binary rate multiplier 17, the logic unit 21 disables the dividing network 16 such that it may not recommence a new division cycle. On receipt of the next pulse from the frequency reference source 15 after receiving a pulse from the binary rate multiplier 17, the logic unit 21 allows the dividing network to recommence division cycles. It will be appreciated that the signal to the first input of the divider network 16 is always equal to the output from the three most significant bits of the store 16a, but logic unit 21 has the same effect as increasing the divisor by one.

It will be appreciated that while in the particular examples binary stages have been used, the invention can also be applied to any base system of numbering, consequently the binary stages could be replaced by decimal stages. The output from the decimal based apparatus will therefore be $10^n$ during successive input pulses from the transducer. Decimal adjustment means would replace the binary adjustment means in the decimal system. It will be further appreciated that if $f_r/f_i < 10^n$ (decimal) or $< 2^n$ (binary) the first signal to the dividing means could be 0, or if $f_r/f_i \geq 10^{n+m}$ (decimal) or $\geq 2^{n+m}$ (binary), a misleading output could be obtained from the apparatus. To obviate this difficulty, the apparatus is arranged to give output pulses at the minimum and maximum rates respectively. This can be achieved by preloading the store 16a with the number $10^n$ (decimal), $2^n$ (binary) whenever the number to be transferred from the counter is $< 10^n$ (decimal), $2^n$ (binary), and by stopping the counter when it reaches the number $10^{n+m} + 1$ (decimal), $2^{n+m} + 1$ (binary) respectively.

I claim:

1. Apparatus for measuring the angular movement of a body, comprising: a transducer detector for providing a signal the frequency $f_i$ of which is dependent on the angular velocity of the body; a reference frequency source providing a reference frequency $f_r$, an $(n + m)$ stage binary counter having a first input connected to said transducer detector and a second input connected to said reference frequency source, for counting the number of reference pulses in time period $1/f_i$; an $(n + m)$ stage binary store for receiving a count from said counter when the latter receives a signal from the transducer detector; an $n$-stage binary rate multiplier having a first input for receiving the n least significant figures of the store, and a second input for receiving an output signal from the apparatus; said rate multiplier being arranged to generate, during the period in which the rate multiplier receives $2^n$ binary pulses at said second input, a number of output pulses which is equal to the number of pulses applied to said first input; dividing means receiving first input signals equal to the m most significant figures of the store in the absence of an output signal from said rate multiplier, and receiving second input signals from said reference source; said dividing means producing an output signal which forms said output signal of the apparatus and which is determined by dividing the frequency reference signal by the signal applied to said first input of the dividing means; and logic means modifying the output signal from said dividing means when an output signal is obtained from said rate multiplier; whereby $2^n$ output pulses are received between successive input pulses from the transducer detector, the maximum value of $f_r/f_i$ being $2^{n+m}$, and the minimum value of $f_r/f_i$ being $2^n$.

2. Apparatus as claimed in claim 1 in which said modifying means comprises a logic circuit connected to receive a first input signal from the m most significant bits of said store; a second input signal from the output of said rate multiplier and a third input signal provided by said output signal from the dividing means, whereby; in the absence of an output signal from said rate multiplier the output signals from said store appears at the output of the logic circuit, and in the presence of an output signal from said rate multiplier the logic unit increases the output signals from the store by one.

3. Apparatus as claimed in claim 1 in which said modifying means comprises a logic circuit connected to receive a first input signal from said reference frequency source and a second input signal from the output of said rate multiplier; whereby in the presence of an output signal from the rate multiplier the dividing means is rendered inoperative.

4. Apparatus as claimed in claim 1 which includes adjustable means for reducing the number of pulses applied by said reference frequency source to said counter during the time $1/f_i$.

5. Apparatus as claimed in claim 1 which includes means for reducing the number of pulses applied by said reference frequency source to said dividing means during the time $1/f_i$.

* * * * *